United States Patent
Webb et al.

(10) Patent No.: US 10,504,053 B2
(45) Date of Patent: *Dec. 10, 2019

(54) PROVIDING REPLACEMENT PRINTING FLUID TO A PRINTER

(71) Applicant: Hewlett-Packard Development Company, L. P., Houston, TX (US)

(72) Inventors: Rowdy K Webb, Portland, OR (US); Daniel M Holcomb, San Diego, CA (US); Phillip A Mcoog, Portland, OR (US); Jean-Frederic Plante, San Diego, CA (US); Jefferson P Ward, Brush Prairie, WA (US); Kerry J Kilk, Vancouver, WA (US); Erik M Peterson, Vancouver, WA (US); Michael Mulloy, Dublin (IE)

(73) Assignee: Hewlett-Packard Development Company L.P., Spring, TX (US)

( * ) Notice: Subject to any disclaimer, the term of this patent is extended or adjusted under 35 U.S.C. 154(b) by 720 days.

This patent is subject to a terminal disclaimer.

(21) Appl. No.: 13/916,459

(22) Filed: Jun. 12, 2013

(65) Prior Publication Data

US 2014/0368565 A1 Dec. 18, 2014

(51) Int. Cl.
- *G06Q 10/08* (2012.01)
- *B41J 2/175* (2006.01)
- *G06K 15/00* (2006.01)

(52) U.S. Cl.
CPC ........ *G06Q 10/087* (2013.01); *B41J 2/17566* (2013.01); *G06K 15/4075* (2013.01); *G06Q 10/083* (2013.01); *B41J 2002/17569* (2013.01)

(58) Field of Classification Search
CPC ........................... B41J 2/17566; G06Q 10/087
See application file for complete search history.

(56) References Cited

U.S. PATENT DOCUMENTS 6,310,692 B1   10/2001 Fan et al.
6,382,762 B1 *  5/2002 Therien .......................... 347/19
(Continued)

FOREIGN PATENT DOCUMENTS

WO   WO-2012148400   11/2012
WO   WO-2014120229    8/2014

OTHER PUBLICATIONS

"Threshold." Merriam-Webster.com. Merriam-Webster, n.d. Web. Nov. 22, 2017.*

(Continued)

*Primary Examiner* — John E Breene
*Assistant Examiner* — Jeffrey C Morgan
(74) *Attorney, Agent, or Firm* — HP Inc. Patent Department

(57) ABSTRACT

A method performed using a computer includes receiving a cumulative consumption value for a printing fluid corresponding to a supply from a printer at the computer. The method also includes calculating a plurality of variable values by way of the cumulative consumption value for the printing fluid, a statistically derived depletion quantity for the printing fluid, and an estimated time to ship a supply of replacement printing fluid to the printer to form calculated variable values. The method also includes causing the supply of replacement printing fluid to be shipped to the printer in accordance with the calculating.

16 Claims, 5 Drawing Sheets

(56) References Cited

U.S. PATENT DOCUMENTS

| | | | |
|---|---|---|---|
| 6,493,517 B1 | 12/2002 | Hanson | |
| 6,985,877 B1 * | 1/2006 | Hayward et al. | 705/7.41 |
| 7,216,951 B2 | 5/2007 | Garrana et al. | |
| 7,344,215 B2 | 3/2008 | Cutler et al. | |
| 7,433,607 B2 | 10/2008 | Thomas | |
| 8,186,785 B1 | 5/2012 | Gold et al. | |
| 8,271,348 B2 | 9/2012 | Rise et al. | |
| 2002/0113991 A1 | 8/2002 | Borg et al. | |
| 2003/0043401 A1 | 3/2003 | Abel et al. | |
| 2005/0219284 A1 | 10/2005 | Shima | |
| 2007/0188530 A1 | 8/2007 | Garrana et al. | |
| 2011/0188070 A1 | 8/2011 | Pala et al. | |
| 2012/0027423 A1 | 2/2012 | Kawai | |

OTHER PUBLICATIONS

International Searching Authority, International Search Report and Written Opinion, issued in PCT/US2013/024234, dated Oct. 29, 2013.

Spiceworks inc., "Spiceworks Automates $3 Billion in Printer Ink Purchasing for World's Largest Social Network of IT Professionals," Sep. 29, 2011, <http:/www.spiceworks.com/news/press-release/2011/09-29/>.

Inkbank, "Refillable Epson ink cartridges (auto reset)," (Web Page), 7 pages, available at http://www.inkbank.com.au/category79_1.htm.

U.S. Appl. No. 14/591,586, Final Rejection dated Nov. 16, 2015, pp. 1-13 and attachments.

U.S. Appl. No. 14/591,586, Non-Final Rejection dated Feb. 27, 2015, pp. 1-13 and attachments.

* cited by examiner

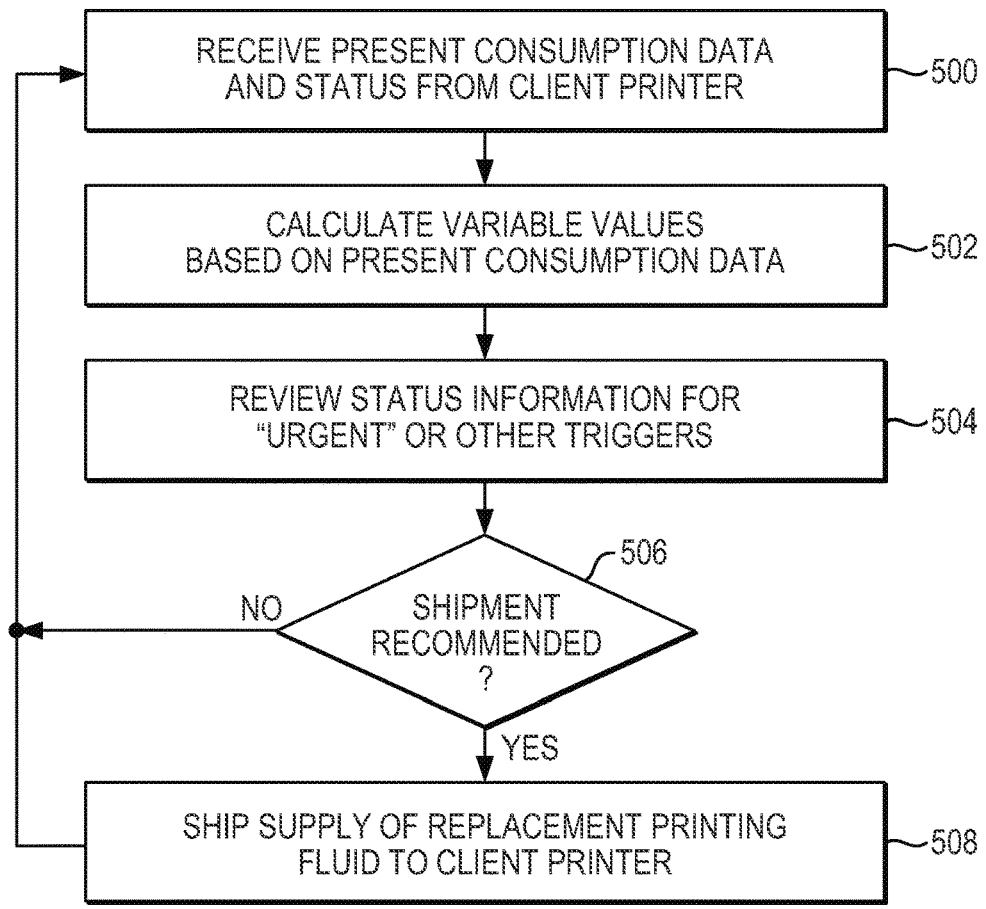

PROVIDING REPLACEMENT PRINTING FLUID TO A PRINTER

BACKGROUND

Printers consume ink during normal operation in order to form images on media. Printers such as inkjet printers may also consume ink in order to refresh nozzles during a maintenance operation.

BRIEF DESCRIPTION OF THE DRAWINGS

The present embodiments will now be described, by way of example, with reference to the accompanying drawings, in which:

FIG. 4 depicts a table including illustrative printing fluid quantities in accordance with a function according to the present teachings;

FIG. 5 depicts a flow diagram of a method according to an example of the present teachings.

DETAILED DESCRIPTION

Printers consume printing fluid such as ink during normal operation in order to form images on media. Printers such as inkjet printers may also consume ink in order to refresh nozzles during a maintenance operation. The printing fluid may be supplied to and installed in the printers as supplies such as printing fluid cartridges in a form of replaceable ink cartridges. Periodically, the respective ink cartridges would need to be replaced due to printing fluid consumption, and the like. At times, however, replacement ink cartridges may not be readily available during a print job at the printer location resulting in an extended amount of downtime of the printer. Alternatively, an overabundance of replacement ink cartridges may be stocked at the printer location resulting in an inefficient use of storage space, and the like.

In examples, a method performed using a computer includes receiving a cumulative consumption value for a printing fluid corresponding to a supply from a printer at the computer. The method also includes calculating a plurality of variable values by way of the cumulative consumption value for the printing fluid, a statistically derived depletion quantity for the printing fluid, and an estimated time to ship a supply of replacement printing fluid to the printer to form calculated variable values. The calculating is performed at least in part by the computer. The method also includes causing the supply of replacement printing fluid to be shipped to the printer in accordance with the calculating. For example, respective replacement ink cartridges may be delivered to the address at which the printer is located. Accordingly, replacement ink cartridges may be provided to a respective printer in a timely, convenient, and efficient manner. Thus, replacement ink cartridges may be readily available during a print job to the printer to reduce an extended amount of downtime of the printer, inefficient use of storage space, and over supplying replacement ink cartridges.

Figure 1:
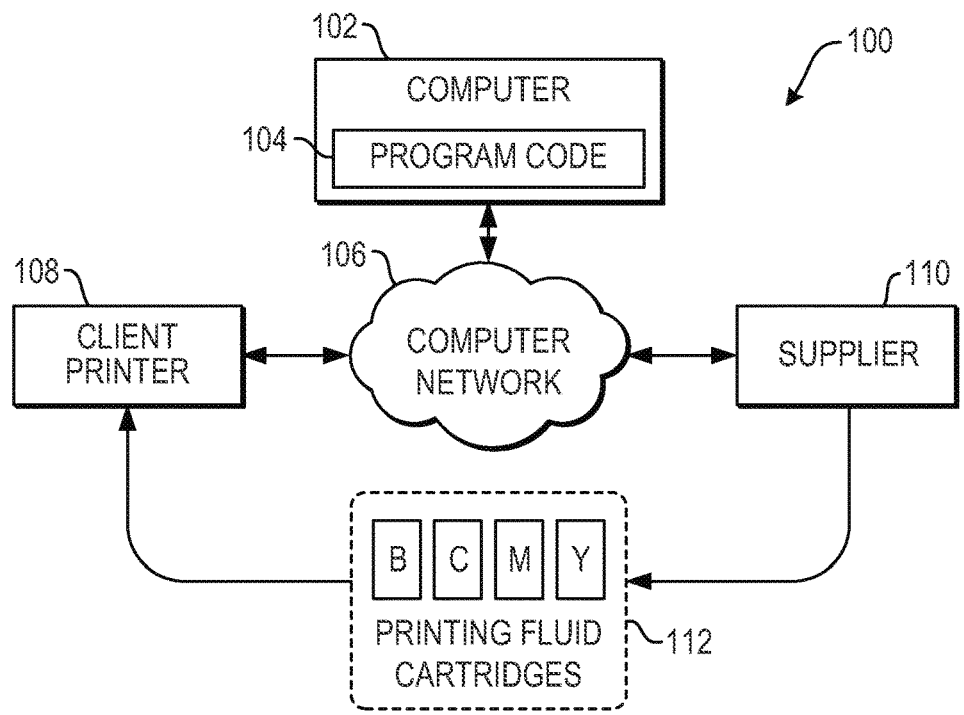
FIG. 1 depicts a block diagram of a system according to an example of the present teachings.

Attention is directed now to FIG. 1, which depicts a block diagram of a system 100 in accordance with the present teachings. The system 100 is illustrative and non-limiting with respect to the present teachings. Other systems, devices, constituencies or configurations can also be used. In one non-limiting example, the system 100, for example, may be in a form of a subscriber client printing fluid supply system.

Referring to FIG. 1, in some examples, the system 100 includes a computer 102, a client printer 108, and a supplier 110. The computer 102 may be in a form of a subscription server. The computer 102 is configured to perform various respective functions in accordance with the present teachings. The computer 102 operates in accordance with a machine-readable program code 104 that is stored on a machine-accessible tangible media (e.g., magnetic, optical, solid-state, and the like). The computer 102 is configured and coupled to communicate with various remote entities by way of a computer network 106 such as the Internet.

The client printer (printer) 108 is defined by a printer configured to produce images on media using printing fluid such as ink. For example, the printer 108 may include an inkjet printer to eject printing fluid to form images on sheet media. The printing fluid, for example, may include a variety of colors such as black, cyan, magenta, and yellow stored in respective printing fluid cartridges 112. Such imaging can be defined by or include text, indicia, graphic images, photographic images, and the like. The printer 108 is coupled to communicate with the computer 102 by way of the computer network 106 such as the Internet.

The supplier 110 is coupled to communicate with the computer 102 by way of the computer network 106 such as the Internet. The supplier 110 can be defined by or include any entity having (or controlling) tangible resources to replenish those consumed by the printer 108 during normal operations. The supplier 110 operates so as to ship printing fluid cartridges 112 (e.g., supplies) such as consumables to the client printer 108 as instructed by the computer 102.

The system 100 is general and non-limiting in nature with respect to the present teachings. In some examples, the computer 102 is operated by a business entity having an interest in or association with the client printer 108 (e.g., the original equipment manufacturer). For example, the client printer 108 is operated by a private or business entity that has entered a consumables provisioning agreement or "subscription" with the business entity of the computer 102. The supplier 110 is a business entity possessing or having access to printing fluid cartridges 112 (or other consumables) to be provided to the user of the printer 108 in accordance with an agreement with the business entity of the computer 102. The present teachings also contemplate other scenarios and varying relationships between respective entities.

Figure 2:
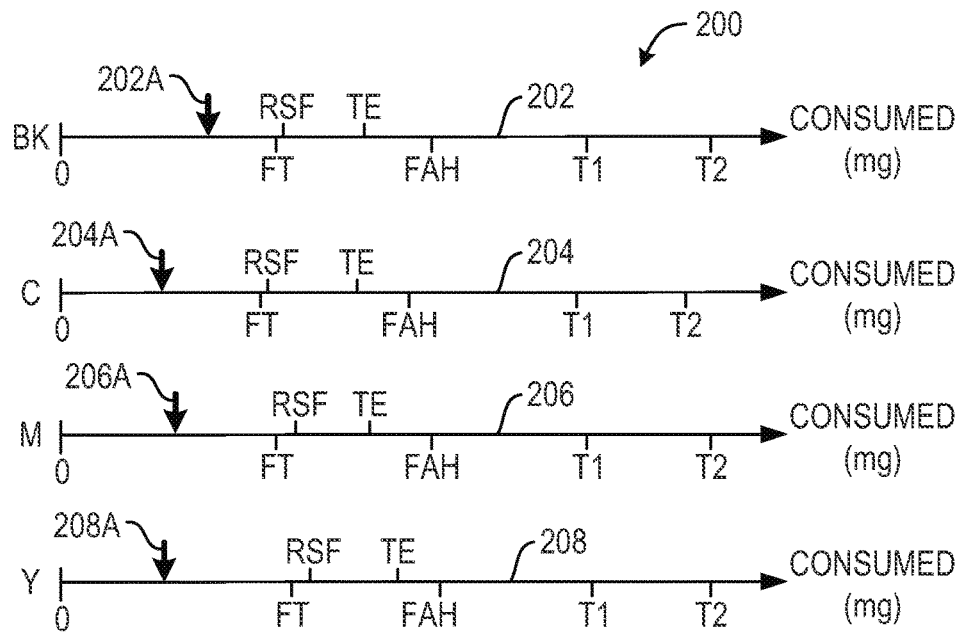
FIG. 2 depicts a plurality of respective printing fluid consumption scales and corresponding variable values in accordance with an illustration of the present teachings.

Reference is now made to FIG. 2, which depicts a set 200 of printing fluid consumption scales 202, 204, 206 and 208. The respective printing fluid consumption scales (scales) 202-208 are illustrative and non-limiting with respect to the present teachings. Other scales, each being defined by or including other respective values or coefficients can also be defined and used.

The scales 202, 204, 206 and 208 correspond to four colors of printing fluid, each held in a respective reservoir, as used by an illustrative printer (e.g., 108). Specifically, the four illustrative colors are black (scale 202), cyan (scale 204), magenta (scale 206) and yellow (scale 208). Each of the scales 202-208 represents a cumulative consumption of printing fluid of the corresponding color, in milligrams, and each is defined by an analogous plurality of variable values as described hereinafter. Other suitable volumetric or mass units, and the like, can also be used.

Each scale 202-208 includes a present consumption indicator (indicator) 202A, 204A, 206A and 208A, respectively. The indicators (202A-208A) correspond to the instantaneous cumulative consumption of that color of printing fluid, beginning from zero consumption (e.g., a full printing fluid cartridge or reservoir). Each scale 202-208 also includes a respective, first statistically derived variable value "T1", which is a cumulative consumption at which, for example, 0.1% of the statistical population of printing fluid reservoirs was depleted (e.g., empty). Each scale 202-208 also includes a respective, second statistically derived variable value "T2", which is a cumulative consumption at which, for example, 50% of the statistical population of printing fluid reservoirs was depleted. Other respective, statistically derived values can also be used.

Each scale 202-208 also includes a respective variable value "FT", or "fulfillment trigger", which corresponds to a cumulative consumption of printing fluid (e.g., 202A) that triggers a shipment of a supply of replacement printing fluid, for example, in the form of a printing fluid cartridge (e.g., 112) from a supplier (e.g., 110) to a printer (e.g., 108). Each scale 202-208 also includes a respective variable value "RSF", or "request supply fulfillment", which corresponds to a cumulative consumption of printing fluid that triggers a printer to post device status to the computer 102, at which the printing fluid consumed value may trigger a printing fluid fulfillment event. For example, the computer may recalculate, and decide to push RSF "out" (e.g., make it larger) and send a new credential packet to the printer with the larger RSF value.

Each scale 202-208 also includes a respective variable value "TE", or "trigger expected", which corresponds to a cumulative consumption of printing fluid that triggers a printer to indicate to a user that a shipment of a supply of replacement printing fluid is recommended. For example, the printer may be connected to the computer network to enable a supplier to send the supply of replacement printing fluid such as a replacement printing fluid cartridge. Each scale 202-208 further includes a respective variable value "FAH", or "fulfillment at home", which corresponds to an estimated cumulative consumption of printing fluid at a time of delivery of a shipment of the supply of replacement printing fluid to a printer.

As depicted for each of the respective scales 202-208, in some examples, the variable values are quantitatively related as follows: FT<RSF<TE<FAH<T1<T2. Other variable values or other quantitative orders can also be defined and used according to the present teachings. Specific mathematical functions for calculating the respective variable values are described below.

The printing fluid consumption scales 202-208 depict calculated values corresponding to the triggering of respective events or actions in accordance with the present teachings. Thus, as a given color of printing fluid (e.g., black ink) is consumed during normal printing operations, the cumulative consumption value (or quantity) of that printing fluid progressively reaches at least some of the variable values (e.g., FT, then RSF, and the like). Replenishment printing fluid, for example, including supplies of replacement printing fluid such as printing fluid cartridges in a form of respective ink cartridges, is shipped to the printer accordingly. A printer user can anticipate, within a statistical margin of certainty, having adequate supplies of the respective printing fluid colors so as to continue normal printing operations until the arrival of a supply of replacement printing fluid (e.g., replenishment arrival).

Figure 3A:
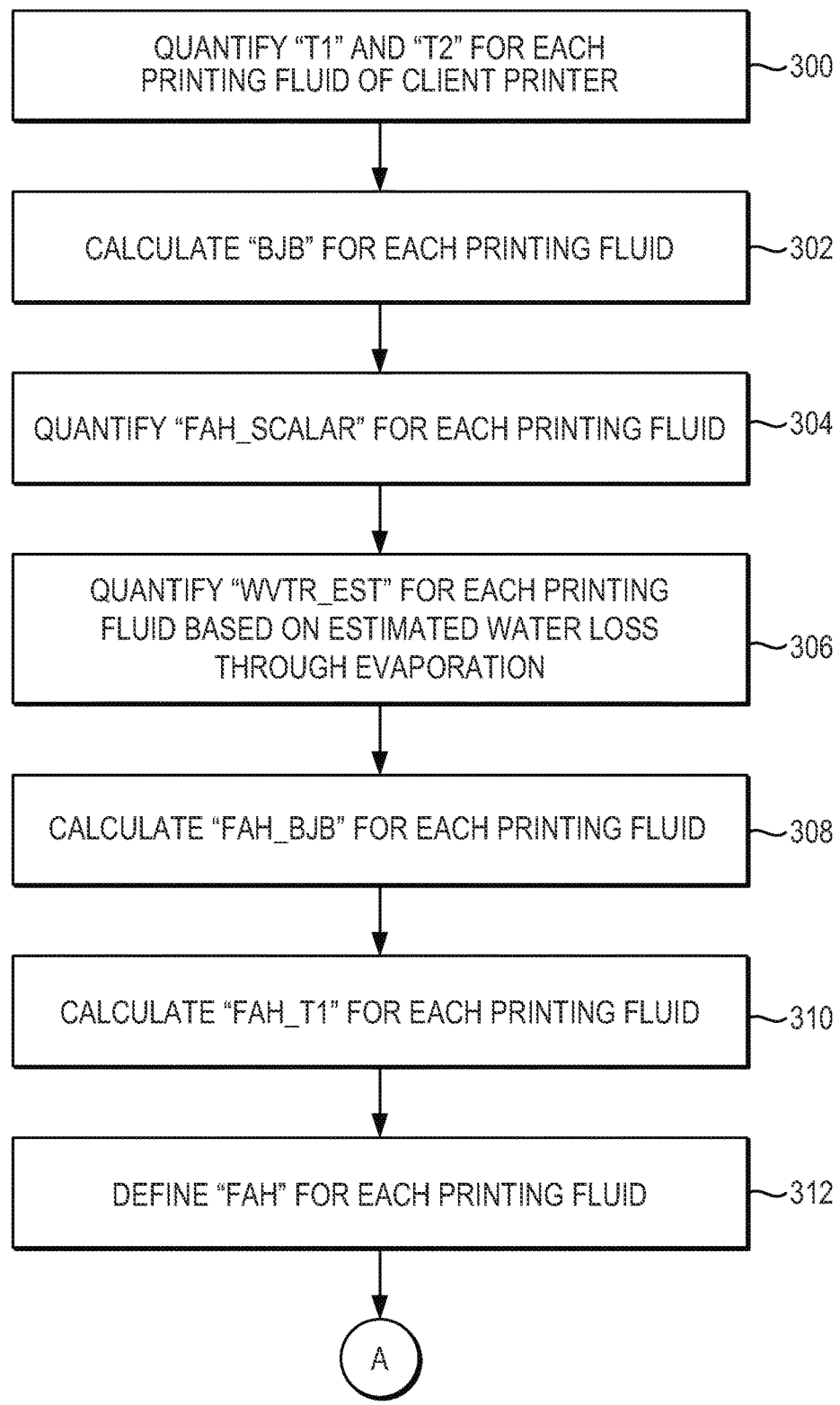
FIGS. 3A and 3B collectively depict a flow diagram of a method according to an example of the present teachings.
Figure 3B:
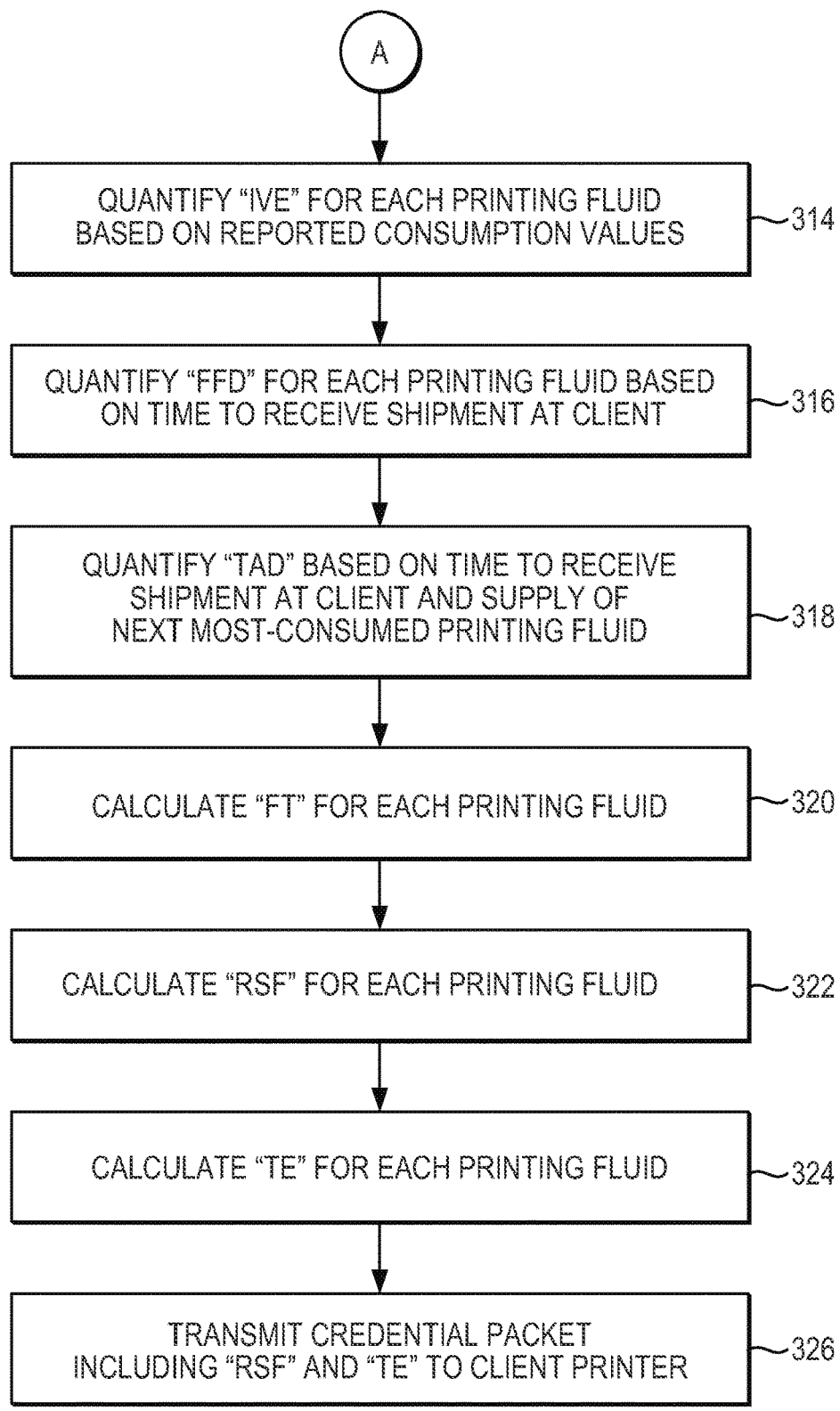

Reference is made now to FIGS. 3A and 3B, which collectively depict a flow diagram of a method according to the present teachings. The method of FIGS. 3A-3B includes particular steps performed in a particular order of execution. However, other methods including other steps, omitting depicted steps, or proceeding in other orders of execution can also be defined and used. Thus, the method of FIGS. 3A-3B is illustrative and non-limiting with respect to the present teachings. Reference is also made to FIGS. 1 and 2 in the interest of illustrating the method of FIGS. 3A-33. In some examples, the method of FIGS. 3A-3B is performed predominantly (or entirely) by a computer or subscription server.

At block 300, variables "T1" and "T2" are quantified for each printing fluid such as a respective supply of a client printer. For purposes of a present example, a printer 108 operates normally using four different colors of ink (black, cyan, magenta and yellow), each within a respective, replaceable printing fluid cartridge (reservoir). Each of the respective supplies such as respective printing fluid cartridges (e.g., 112) can be defined by respective T1 and T2 values. For example, 99.9% of supplies will deliver at least T1 quantity of printing fluid and 50% of supplies will deliver at least T2 quantity of printing fluid. Thus, for example, a total of eight variables are quantified for four respective printing fluid cartridges: four T1 values; and four T2 values. The quantification of the variables T1 and T2 is performed by (or using) a computer 102 running a program code 104 and is generally put into the milligrams format by the printer. That is, in some examples, T1 and T2 may be provided by the respective supply (e.g., ink cartridge) and the printer may format such information into milligrams of printing fluid available to pipe it to the computer 102 and/or web service.

At block 302, a variable "BJB" is calculated for each printing fluid. In the present example, a variable named "big job buffer", or BJB, is calculated for each printing fluid according to: BJB=2*(PP)*(0.5*[ISO1]+0.5*[ISO4]). "PP" equals the pages a client is authorized to print in a time period (e.g., one month) for the base fee under a subscription agreement. "ISO1" and "ISO4" may refer to a respective amount of printing fluid consumed, for a given print platform and a given printing fluid color, when printing a respective predetermined page. For example, the respective predetermined page corresponding to "ISO1" may be the first page and the respective predetermined page corresponding to "ISO4" may be the fourth page of the five page set used in an industry-standard ink yield suite such as the International Organization for Standardization/International Electrotechnical Commission 24711 (ISO/IEC 24711). In some examples, BJB may be quantified in volumetric (or mass) units, accordingly.

At block 304, a coefficient "FAH_SCALAR" is quantified for each printing fluid. In the present example, a variable named "fulfillment at home scalar", FAH_SCALAR, is a respective, dimensionless coefficient or constant in the range of −1 to 1 for each printing fluid. This number is used to adjust (scale, or temper) the effect of variables within other calculations according to the present teachings.

At block 306, a variable "WVTR-EST" is quantified for each printing fluid based on estimated water vapor loss through evaporation. In the present example, a variable named "estimated water vapor transfer rate" (e.g., estimated water vapor loss), or WVTR-EST, is quantified for each of the four printing fluids. For example, the estimated water vapor transfer rate may correspond to an estimated weight (mg) of printing fluid that has evaporated from a supply (through the pen walls, and the like) since the supply was originally installed in the printer. Each WVTR-EST quantity corresponds to an estimated weight of a printing fluid that has evaporated from a supply since the supply was originally installed in a respective printer. In some examples, WVTR-EST is quantified in volumetric (or mass) units, accordingly.

At block 308, a variable "FAH_BJB" is calculated for each printing fluid. In the present example, a variable named "fulfillment at home-big job buffer", or FAH_BJB, is calculated based on quantities defined or calculated above, according to: FAH_BJB=T1+FAH_SCALAR*(T2−T1)−BJB−WVTR-EST. Each FAH_BJB quantity corresponds to a quantity of a printing fluid that could be consumed by a respective printer between a replacement shipment trigger and delivery of a supply of replacement printing fluid (e.g., printing fluid cartridge) at a customer location. In some examples, FAH_BJB is quantified in volumetric (or mass) units, accordingly.

At block 310, a variable "FAH_T1" is calculated for each printing fluid. In the present example, a variable named "fulfillment at home-T1", or FAH_T1, is calculated according to: FAH_T1=T1−WVTR-EST. Each FAH_T1 quantity corresponds to an estimated consumption value for printing fluid at time of replenishment arrival at a client based on consistent printing (e.g., continuing to print per "printing fluid velocity estimate" through receipt of replacement supply). In some examples, FAH_T1 is quantified in volumetric (or mass) units, accordingly.

At block 312, a variable "FAH" is defined for each printing fluid. In the present example, a variable named "fulfillment at home", or FAH, is defined as the lesser of FAH_BJB or FAH_T1. Thus, FAH=FAH_BJB, if FAH_BJB<FAH_T1. Otherwise, FAH=FAH_T1. Each of the respective FAH quantities is selected for use in calculating other variable values, which in turn are used to determine when a replenishment shipment of a supply of replacement printing fluid (of the corresponding color) will be triggered. The method continues to block 314 as depicted by connector "A".

At block 314, a variable "IVE" is quantified for each printing fluid based on reported consumption values. In the present example, a variable named "printing fluid velocity estimate", or IVE, is calculated for each printing fluid using cumulative consumption values reported from the printer 108 to the computer 102. Each IVE quantity corresponds to an average time rate of consumption of that printing fluid in quantity per day. In some examples, IVE is quantified in units of volume/day (or mass/day).

At block 316, a variable "FFD" is quantified for each printing fluid based on a time to receive shipment of a supply of replacement printing fluid at the client. In the present example, a variable named "fulfillment days", or FFD, is calculated for each printing fluid based on previous, estimated, or otherwise acquired shipping times between the supplier 110 and the printer 108. In some examples, FFD is quantified in units of days.

At block 318, a variable "TAD" is quantified based on time to receive a shipment of the supply of replacement printing fluid at the client and on a supply of a next most-consumed printing fluid. In the present example, a variable named "tag along days", or TAD, is quantified for each printing fluid based on shipping time between the supplier 110 and the printer 108, and by estimating the number of days before another one of the printing fluids (next most-consumed) will require replenishment, as well. In this way, at least two printing fluids (of different colors) can be shipped together in the interest of economy and efficiency. In some examples, TAD is quantified in units of days.

At block 320, a variable "FT" is calculated for each printing fluid. In the present example, a variable named "fulfillment trigger", or FT, is calculated according to: FT=FAH−IVE*(FFD+TAD). Each FT quantity corresponds to a cumulative consumption of printing fluid that triggers a shipment of a supply of replacement printing fluid to the printer 108. In some examples, FT is quantified in volumetric (or mass) units, accordingly. In some examples, TAD having a value of zero is used in the first run though the method. For example, if a supply inside a printer triggers fulfillment using TAD=0, then the rest of the supplies in the printer are "re-run" through the algorithm using the non-zero value for TAD. If additional supply replacements are triggered, such supplies are considered "tag along shipments".

At block 322, a variable "RSF" is calculated for each printing fluid. In the present example, a variable named "request supply fulfillment", or RSF, is calculated according to: RSF=FT+RSF_SCALAR*(FAH−FT); where RSF_SCALAR is a coefficient in the range of 0 to 1. Each RSF quantity corresponds to a cumulative consumption of printing fluid that triggers the printer 108 to transmit a printing fluid consumed value to the computer 102. In some examples, RSF is quantified in volumetric (or mass) units, accordingly.

At block 324, a variable "TE" is calculated for each printing fluid. In the present example, a variable named "trigger expected", or TE, is calculated for each printing fluid according to: TE=FT+TE_SCALAR*(FAH−FT); where TE_SCALAR is a coefficient in the range of 0 to 1. Each TE quantity corresponds to a cumulative consumption of printing fluid that triggers the printer 108 to indicate to a user, for example, that a printer-to-internet connection is recommended so that the supply of replacement fluid can be sent out. In some examples, TE is quantified in volumetric (or mass) units, accordingly.

At block 326, a credential packet including "RSF" and "TE" values is transmitted to the client printer. In the present example, the computer 102 transmits information, also referred to as a "credential packet" to the printer 108 by way of the computer network 106 such as the Internet. Such information includes information germane to operations of the printer 108 under the subscription with the business entity of the computer 102. The information includes, among other things, the variable values such as the RSF and TE calculated above. The printer 108 can store this information, and trigger respective actions according to the values RSF and TE, and the like.

Reference is made now to FIG. 4, which depicts a table 400 of printing fluid quantities. The table 400 and respective printing fluid quantities thereof are illustrative and non-limiting with respect to the present teachings. Other respectively varying values can also be used in accordance with the present teachings. The printing fluid quantities of the table 400 corresponds to the expression (function, or relationship) 402. The table 400 therefore provides the particular printing fluid quantities for four respective colors in accordance with the expression 402, for the printing fluid cartridges used in one illustrative printer (e.g., 108). In particular, the illustrative quantities of printing fluid are: 16.6 milligrams (black); 4.7 milligrams (cyan); 7.5 milligrams (magenta); and 10.7 milligrams (yellow). Quantities corresponding to other printing fluid cartridges used in other respective printers can also be used according to the present teachings.

Reference is made now to FIG. 5, which depicts a flow diagram of a method according to the present teachings. The method of FIG. 5 includes particular steps performed in a particular order of execution. However, other methods including other steps, omitting one or more of the depicted steps, or proceeding in other orders of execution can also be defined and used. Thus, the method of FIG. 5 is illustrative and non-limiting with respect to the present teachings. Reference is also made to FIGS. 1 and 2 in the interest of illustrating the method of FIG. 5. In some examples, the method of FIG. 5 is performed predominantly (or entirely) by a computer.

At block 500, present consumption data and status information is received from a client printer. For purposes of a present example, the client printer 108 transmits information to the computer 102 by way of a computer network 106 such as the Internet. The information includes present cumulative consumption values (e.g., 202A-208A). The information can also include other data or status values such as, without limitation, a request to ship a supply of replacement printing fluid now, total number of sheet media printed since last replenishment, and the like.

At block 502, variable values are calculated based on the present consumption data. In the present example, the computer 102 calculates (or quantifies) respective variable values using the cumulative consumption values received from the printer 108. The computer 102 can, for example, perform some (or all) of the blocks described above with respect to the method of FIGS. 3A-3B. For instance, if the present cumulative consumption of black ink (e.g., 202A) is equal to or greater than the corresponding variable value "FT", then a shipment of a supply of replacement black ink to the printer 108 has been triggered.

At block 504, the status information is reviewed for "urgent" or other triggers. In the present example, the computer 102 reviews the information received from the printer 108 at block 500 above. Specifically, the computer 102 determines if an "urgent" request for a supply of replacement printing fluid, a failure or failure codes, or other pertinent data or status flags are present.

At block 506, it is determined if a shipment of a supply of replacement printing fluid is recommended. In the present example, the computer 102 determines if a shipment of the supply of replacement printing fluid, or another consumable, to the printer is presently recommended in accordance with the status information (e.g., block 504) or the calculated variable values (e.g., block 502). In some examples, the first time shipment is triggered based on printing fluid levels and the like for a given printing fluid cartridge (e.g., supply), that the given printing fluid cartridge is identified as having already triggered a replacement and, thus, only one trigger per printing fluid cartridge is created. That is, in some examples, future processing will not trigger additional replacements for a respective printing fluid cartridge that already triggered a replacement, regardless of the printing fluid levels, and the like. If a shipment of a supply of replacement printing fluid (or other) has been triggered accordingly, then the method proceeds to block 508 below. If no shipment has been triggered, then the method returns to block 500 above, and the computer 102 awaits the next transmission of information from the printer 108.

At block 508, the supply of replacement printing fluid (e.g., replenishment consumables) such as respective replaceable printing fluid cartridges is shipped to the client printer. In the present example, the computer 102 instructs the supplier 110 by way of the computer network 106 such as the Internet to ship a supply of replacement printing fluid such as a respective printing fluid, or other consumables, to the client printer 108 in accordance with the trigger or triggers invoked or determined above. The supplier 110 responds to the instruction by shipping corresponding supplies of replacement printing fluid (or other product) to the printer 108 by way of common carrier, postal, or other suitable entity.

Figure 6:
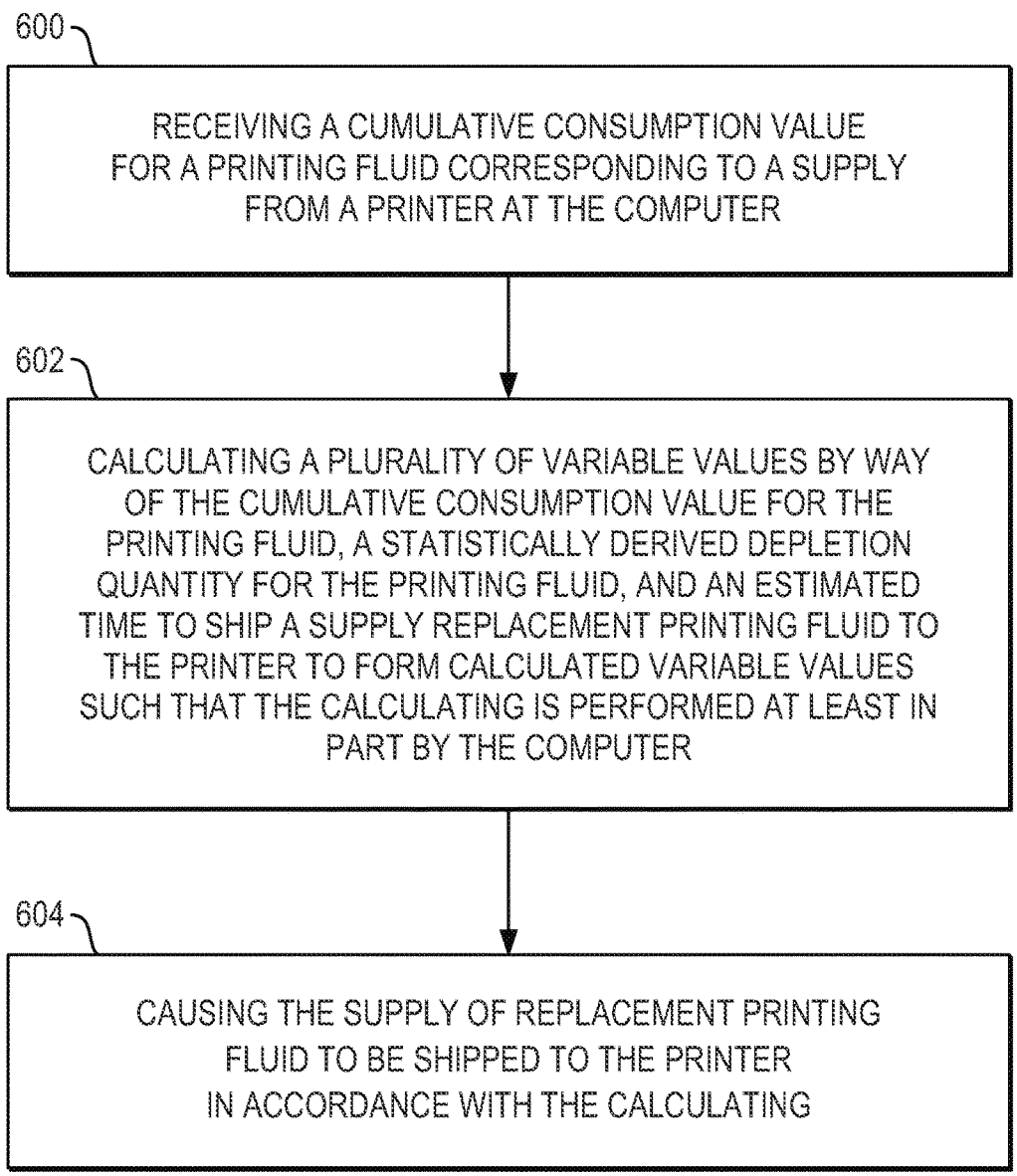
FIG. 6 depicts a flow diagram of a method according to an example of the present teachings.

Reference is made now to FIG. 6, which depicts a flow diagram of a method according to the present teachings. The method of FIG. 6 includes particular steps performed in a particular order of execution. However, other methods including other steps, omitting one or more of the depicted steps, or proceeding in other orders of execution can also be defined and used. Thus, the method of FIG. 6 is illustrative and non-limiting with respect to the present teachings. In some examples, the method of FIG. 6 is performed predominantly (or entirely) by a computer.

At block 600, a cumulative consumption value for a printing fluid corresponding to a supply from a printer is received at the computer. The printer and the computer may be coupled to communicate with each other by way of a computer network such as the Internet. At block 602, a plurality of variable values by way of the cumulative consumption value for the printing fluid, a statistically derived depletion quantity for the printing fluid, and an estimated time to ship a supply of replacement printing fluid to the printer is calculated to form calculated variable values. In some examples, the calculating is performed at least in part by the computer. At block 604, the supply of replacement printing fluid is caused to be shipped to the printer in accordance with the calculating.

In some examples, the method may also include receiving status information from the printer at the computer, determining if the status information includes a specific request for the supply of replacement printing fluid, and causing the supply of replacement printing fluid to be shipped to the printer in accordance with the determining. In some examples, causing the supply of replacement printing fluid to be shipped to the printer may include transmitting an instruction from the computer to a supplier entity. The method may also include communicating a credential packet from the computer to the printer. The credential packet may include at least one of the calculated variable values. In some examples, the credential packet indicates whether a shipment of the supply of replacement printing fluid to the printer has been triggered.

In some examples, one of the variable values is defined as: BJB=2*PP*(0.5*ISO1+0.5*ISO4), such that BJB refers to a job buffer value for a printing fluid, PP refers to a client subscription in numbers of pages, "ISO1" refers to a respective amount of a printing fluid consumed for a given print platform and a given printing fluid color when printing a respective predetermined page, and "ISO4" refers to a respective amount of printing fluid consumed, for a given print platform and a given printing fluid color, when printing a respective predetermined page. For example, the respective predetermined page corresponding to "ISO1" may be the first page and the respective predetermined page corresponding to "ISO4" may be the fourth page of the five page set used in an industry-standard ink yield suite (e.g., ISO/IEC 24711) as previously discussed.

In some examples, one of the variables values is defined as: FAH_BJB=T1+FAH_SCALAR*(T2−T1)−BJB−WVTR-EST, such that FAH_BJB refers to a quantity of a printing fluid that could be consumed by a respective printer between replacement shipment trigger and delivery of a supply of replacement printing fluid (e.g., printing fluid cartridge) at a customer location, T1 refers to a first statistically derived depletion quantity for a printing fluid, FAH_SCALAR refers to a constant in the range of −1 to 1, T2 refers to a statistically derived depletion quantity for a printing fluid greater than T1, BJB refers to a job buffer value for a printing fluid, and WVTR-EST refers to an estimated water vapor transfer rate (e.g., estimated water vapor loss) for a printing fluid at a time of an arrival of the supply of replacement fluid (e.g., replenishment arrival) at a client. In some examples, T1 and T2 are in volumetric or mass units.

In some examples, the variables values include a variable defined as: FAH_T1=T1−WVTR-EST, such that FAH_T1 refers to an estimated consumption value for a printing fluid at time of an arrival of the supply of replacement fluid at the client based on consistent printing as previously discussed, T1 refers to a first statistically derived depletion quantity for ink, and WVTR-EST refers to an estimated water vapor transfer rate (e.g., estimated water vapor loss) as previously discussed.

In some examples, one of the variable values is defined as a fulfillment trigger (FT) value corresponding to a cumulative consumption of a printing fluid that triggers a shipment of a supply of replacement printing fluid to the printer. Also, one of the variable values is defined as a request supply fulfillment (RSF) value corresponding to a cumulative consumption of a printing fluid that triggers the printer to transmit printing fluid consumed (device status) to the computer. The credential packet may include the RSF value.

Additionally, one of the variable values is defined as a trigger expected (TE) value corresponding to a cumulative consumption of printing fluid that triggers the printer to indicate to a user that at least one of a shipment of a supply of replacement printing fluid is recommended and that a connection between the printer and a computer network such as a respective Cloud server or servers is recommended so that supplier can provide a shipment of the supply of replacement printing fluid. The credential packet may include the TE value. Further, one of the variable values is defined as a fulfillment at home (FAH) value corresponding to an estimated cumulative consumption of a printing fluid at a time of delivery of a shipment of the supply of replacement printing fluid to the printer. The credential packet may include the FAH value.

In general, the foregoing description is intended to be illustrative and not restrictive. Many embodiments and applications other than the examples provided would be apparent to those of skill in the art upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

What is claimed is:

1. A method performed by a computer, comprising:
   remotely communicating with a printer to receive data indicating a cumulative consumption value for a printing fluid consumed in the printer;
   calculating a plurality of variable values including a first variable value that represents a quantity of cumulative consumption of the printing fluid that triggers a fulfillment event, a second variable value that represents a quantity of the printing fluid that is depleted at the printer for a given time interval, the second variable value derived based on an estimated evaporation quantity loss, and a third variable value that is a statistically derived depletion quantity representing a cumulative consumption of the printing fluid that causes depletion of a printing fluid supply,
   wherein one or more predefined relationships are defined between the first variable value, the second variable value, and the third variable value;
   communicating a credential packet from the computer to the printer, the credential packet including at least one of the calculated variable values;
   receiving a variation of the second variable value;
   changing the first variable value based on the variation of the second variable value and based on the one or more predefined relationships;
   triggering the fulfillment event in response to the computer determining that the indicated cumulative consumption value exceeds the changed first variable value; and
   in response to the triggering, signaling a communication across a network to initiate a supply of replacement printing fluid to be shipped to the printer.

2. The method according to claim 1, wherein the plurality of variable values include a fourth variable value, BJB, that is based on a product of PP, ISO1, and ISO4, where:
   BJB=a job buffer value for the printing fluid;
   PP=a client subscription in numbers of pages;
   ISO1=a respective amount of the printing fluid consumed, for a given print platform and a given printing fluid color, when printing a first predetermined page; and
   ISO4=a respective amount of the printing fluid consumed, for a given print platform and a given printing fluid color, when printing another predetermined page.

3. The method according to claim 1, wherein the second variable value is defined as:

$$FAH\_BJB=T1+FAH\_SCALAR*(T2-T1)-BJB-WVTR\text{-}EST;$$

where:
   FAH_BJB=a quantity of the printing fluid that could be consumed by the printer between a replacement shipment trigger and a delivery of the supply of replacement printing fluid at a customer location;
   T1=a first statistically derived depletion quantity for the printing fluid;
   FAH_SCALAR=a constant in the range of −1 to 1;
   T2=a second statistically derived depletion quantity for the printing fluid greater than T1;
   BJB=a job buffer value for the printing fluid; and
   WVTR-EST=an estimated weight of the printing fluid that has evaporated from a supply since the supply was originally installed in the printer.

4. The method according to claim 1, wherein the second variable value is defined as:

$$FAH\_T1=T1-WVTR\text{-}EST;$$

where:
   FAH_T1=an estimated consumption value for the printing fluid at a time of arrival of the supply of replacement printing fluid at a client based on consistent printing;
   T1=a first statistically derived depletion quantity for the printing fluid; and
   WVTR-EST=an estimated weight of a printing fluid that has evaporated from a supply since the supply was originally installed in the printer.

5. The method according to claim 1, wherein the printer and the computer are coupled to communicate with each other by way of the network.

6. The method according to claim 5, further comprising:
receiving status information from the printer at the computer;
determining if the status information includes a specific request for the supply of replacement printing fluid; and
wherein signaling the communication across the network to initiate the supply of replacement printing fluid includes causing the supply of replacement printing fluid to be shipped to the printer.

7. The method according to claim 6, wherein the causing the supply of replacement printing fluid to be shipped to the printer includes transmitting an instruction from the computer to a supplier entity.

8. The method according to claim 1, wherein the credential packet indicates whether a shipment of the supply of replacement printing fluid to the printer has been triggered.

9. The method according to claim 1, wherein the credential packet includes the first variable value.

10. The method according to claim 1, the plurality of variable values includes a request supply fulfillment (RSF) value corresponding to a cumulative consumption of the printing fluid that triggers the printer to transmit a request for the supply of replacement printing fluid to the computer, the credential packet including the RSF value.

11. The method according to claim 1, wherein the plurality of variable values include a trigger expected value representing a cumulative consumption of the printing fluid that triggers establishment of a connection of the printer to the network, the credential packet including the trigger expected value.

12. The method according to claim 1, wherein the plurality of variable values includes a fulfillment at home (FAH) value corresponding to an estimated cumulative consumption of the printing fluid at a time of delivery of a shipment of the supply of replacement printing fluid to the printer, the credential packet including the FAH value.

13. A non-transitory storage medium storing a machine-readable program code, the program code to cause a computer to:
remotely communicate with a printer to receive data indicating a cumulative consumption value for a printing fluid consumed in a printer;
calculate a plurality of variable values including a threshold value that represents a quantity of cumulative consumption of the printing fluid that triggers a fulfillment event, a first variable value that represents a quantity of printing fluid that is depleted at the printer for a given time interval, the first variable value derived based on an estimated evaporation quantity loss, and a second variable value that is a statistically derived depletion quantity representing a cumulative consumption of the printing fluid that causes depletion of a specified percentage of a population of printing fluid supplies,
wherein one or more predefined relationships are defined between the threshold value, the first variable value, and the second variable value;
communicate a credential packet to the printer, the credential packet including a given variable value of the plurality of variable values, the given variable value representing a cumulative consumption of the printing fluid that triggers establishment of a connection of the printer to a network;
receive a variation of at least one of the first variable value or the second variable value;
change the threshold value based on the variation of at least one of the first variable value or the second variable value and based on the one or more predefined relationships;
trigger the fulfillment event in response to the indicated cumulative consumption value exceeding the changed threshold value; and
in response to the triggering, signal a communication across the network to initiate a supply of replacement printing fluid to be shipped to the printer.

14. A computer system comprising:
a non-transitory storage medium storing a machine-readable program code;
a computer, the machine-readable program code executable on the computer to:
remotely communicate with a printer to receive data indicating a cumulative consumption value for a printing fluid consumed in a printer;
calculate a plurality of variable values including a first threshold variable value that represents a quantity of cumulative consumption of the printing fluid that triggers a fulfillment event, a second variable value that represents a quantity of the printing fluid that is depleted at the printer for a given time interval, the second variable value derived based on an estimated evaporation quantity loss, and a third variable value that is a statistically derived depletion quantity representing a cumulative consumption of the printing fluid that causes depletion of a printing fluid supply,
wherein one or more predefined relationships are defined between the first threshold variable value, the second variable value, and the third variable value;
communicate a credential packet from the computer to the printer, the credential packet including at least one of the calculated variable values;
receive a variation of at least one of the second variable value or the third variable value;
change the first threshold variable value based on the variation of at least one of the second variable value or the third variable value and based on the one or more predefined relationships;
trigger the fulfillment event in response to the indicated cumulative consumption value exceeding the changed first threshold variable value; and
in response to the triggering, signal a communication across a network to initiate a supply of replacement printing fluid to be shipped to the printer.

15. The computer system of claim 14, wherein the cumulative consumption value is for the printing fluid of a particular type, from among multiple types of printing fluids used by the printer.

16. The computer system of claim 14, wherein the program code is executable on the computer to initiate the supply of replacement printing fluid in accordance with a subscription agreement associated with the printer.

* * * * *